United States Patent
Kobayakawa

(10) Patent No.: US 6,988,314 B2
(45) Date of Patent: Jan. 24, 2006

(54) ASSEMBLY, TOLERANCE MATCHING AND POST-MANUFACTURING QUALITY ASSURANCE METHOD

(75) Inventor: Mitsuo Kobayakawa, Sidney, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 89 days.

(21) Appl. No.: 10/356,978

(22) Filed: Feb. 3, 2003

(65) Prior Publication Data

US 2004/0148775 A1    Aug. 5, 2004

(51) Int. Cl.
*B21K 3/00* (2006.01)

(52) U.S. Cl. .............. 29/888.01; 29/888.04; 29/888.06; 29/407.05; 29/702; 29/705; 235/462.01; 700/236; 705/28; 705/29

(58) Field of Classification Search ............. 29/407.05, 29/702, 705, 888.01, 888.04, 888.06; 235/462.01; 700/236; 705/28, 29
See application file for complete search history.

(56) References Cited

U.S. PATENT DOCUMENTS

| | | | | |
|---|---|---|---|---|
| 2,796,658 A | * | 6/1957 | Willis | 29/898.062 |
| 3,372,452 A | * | 3/1968 | Firth et al. | 29/888.061 |
| 3,538,590 A | * | 11/1970 | Bederman et al. | 29/407.05 |
| 4,440,118 A | * | 4/1984 | Stang et al. | 123/41.84 |
| 4,872,257 A | * | 10/1989 | Wakamori et al. | 29/701 |
| 5,642,307 A | | 6/1997 | Jernigan | |
| 5,816,229 A | | 10/1998 | Roderweiss et al. | |
| 6,027,022 A | | 2/2000 | Hong | |
| 6,036,087 A | | 3/2000 | Hong et al. | |
| 6,371,373 B1 | | 4/2002 | Ma et al. | |
| 2003/0000060 A1 | * | 1/2003 | Ichikawa et al. | 29/407.01 |
| 2003/0194052 A1 | * | 10/2003 | Price et al. | 378/45 |

FOREIGN PATENT DOCUMENTS

| | | | |
|---|---|---|---|
| EP | 0 317 539 | * | 5/1989 |
| JP | 11-251800 | | 9/1999 |

* cited by examiner

*Primary Examiner*—Eric Compton
(74) *Attorney, Agent, or Firm*—Rankin, Hill, Porter & Clark LLP; Vincent Ciamacco

(57) ABSTRACT

A system and method for assembling an internal combustion engine and for correlating engine information with a vehicle identification number. The engine includes an engine block and a plurality of pistons. The engine block has a plurality of cylinders formed therein, and the inner diameter of each cylinder is measured and recorded as cylinder information. A specific outer diameter of each of the plurality of pistons is measured and recorded as piston information. One of the pistons is selected for each cylinder based upon the recorded cylinder information and the recorded piston information so as to provide a desired piston clearance for each piston/cylinder combination. Engine information, which includes the piston information for each of the selected pistons and the cylinder information, is recorded, and the engine information is correlated with the vehicle identification number to permit the engine information to be accessed via the vehicle identification number.

30 Claims, 4 Drawing Sheets

ASSEMBLY, TOLERANCE MATCHING AND POST-MANUFACTURING QUALITY ASSURANCE METHOD

BACKGROUND OF THE INVENTION

1. Field of the Invention

The present invention relates to a system and method for assembling an internal combustion engine and further relates to a system and method for correlating engine information with a vehicle identification number.

2. Description of Related Art

During assembly of an internal combustion engine, a piston is inserted into each cylinder formed in an engine block. The cylinder must have an inner diameter that is slightly larger than the outer diameter of the piston in order to provide a desired piston clearance. The piston clearance is the distance from the outer surface of the piston to the opposing inner surface of the cylinder.

Engine blocks are typically die-cast and machined to form cylinders having an inner diameter that is within a predetermined cylinder inner diameter tolerance, meaning that the specific diameter of each cylinder is measured and confirmed to be within a range of acceptable cylinder inner diameters, which is defined as the desired inner diameter plus or minus an acceptable variation. The lowest cylinder inner diameter tolerance limits that are considered technological feasible using current manufacturing processes are about ±10 μm. Conventionally, once the inner diameter of each cylinder is confirmed to be within the cylinder inner diameter tolerance, the engine block is passed for further assembly.

Similarly, pistons are conventionally cast and then machined to have an outer diameter that is within a predetermined piston outer diameter tolerance, meaning that the specific outer diameter of the piston is measured and confirmed to be within a range of acceptable piston outer diameters, which is defined as the desired outer diameter plus or minus an acceptable variation. The lowest tolerance limits of the piston outer diameters that are considered technological feasible using current manufacturing processes are about ±10 μm. Once a piston is confirmed to be within the piston outer diameter tolerance, the piston is deemed acceptable for use in the assembly of an internal combustion engine.

At an appropriate point along the assembly line in the conventional method of internal combustion engine assembly, pistons that have previously been determined to be within acceptable piston outer diameter tolerance limits are inserted into cylinders that have previously been determined to be within acceptable cylinder inner diameter tolerance limits. Since each of the pistons and cylinders are within predetermined limits, the resulting piston clearance, although unknown, will necessarily be within the predetermined range of acceptable piston clearance. The engine block, with the pistons inserted into the cylinders, continues along the assembly line for further assembly of various engine components and, thereafter, is installed in a vehicle.

Although the conventional method of assembling internal combustion engines has been used for many years to produce high quality engines, a very small percentage of internal combustion engines produced in accordance with the conventional method exhibit engine-related problems such as, for example, lack of power, unacceptable engine noise, seizure and hard running. Examination of disassembled problem engines suggests that many of these engine-related problems can be attributed to inadequate or excessive piston clearance in one or more cylinders.

It is believed that when a piston that is at the extreme low end of the acceptable piston outer diameter tolerance limits (i.e., the specific outer piston diameter of the piston is about equal to the desired outer piston diameter minus the acceptable variation) is inserted into a cylinder that is at the extreme high end of the acceptable cylinder inner diameter tolerance limits (i.e., the specific inner diameter of the cylinder is about equal to the desired inner cylinder diameter plus the acceptable variation), the piston clearance will be greater than desired. This can produce a "loose" engine, which may suffer from a lack of power or produce unacceptable engine noise. Conversely, when a piston that is at the extreme high end of the acceptable piston outer diameter tolerance limits (i.e., the specific outer piston diameter of the piston is about equal to the desired outer piston diameter plus the acceptable variation) is inserted into a cylinder that is at the extreme low end of the acceptable cylinder inner diameter tolerance limits (i.e., the specific inner diameter of the cylinder is about equal to the desired inner cylinder diameter minus the acceptable variation), the piston clearance will be less than desired. This can produce a "tight" engine, which may be hard running, noisy, or may ultimately seize. The ambient/environmental conditions in which the engine is frequently operated (e.g., predominantly cold geographic regions, predominantly hot geographic regions, high altitudes) as well as maintenance and driving conditions may also exacerbate such potential engine-related problems.

As will be appreciated, such engine-related problems are infrequent. The vast majority of internal combustion engines produced in accordance with the conventional assembly method do not have piston clearances that are problematically greater or less than desired. As noted, in order for piston clearance engine-related problems to arise from the conventional engine assembly method, it is believed that a piston having a specific outer diameter that is at or near the extreme upper end or lower end of the acceptable piston outer diameter tolerance limit must be inserted into a cylinder having a specific inner diameter that is at or near the extreme lower end or upper end, respectively, of the acceptable cylinder inner diameter tolerance limit. Moreover, it is believed that several of such piston/cylinder combinations must exist within an engine, and that the engine must be operated in a harsh environment, before such piston clearance engine-related problems are experienced.

In addition to being uncommon, it is difficult to diagnose a piston clearance related problem in an engine once it has left the manufacturer. Because the specific piston outer diameters and specific cylinder inner diameters are not recorded and associated with the host vehicle, it is impossible under the present engine assembly method to determine if piston clearance may be problematic without tearing down the engine and inspecting the components. Vehicle owners are understandably reluctant to allow a manufacturer to have possession of their vehicle for extended periods of time and to permit the manufacturer to tear down the engine and examine its various components. Moreover, in "tight" engines in particular, increased friction may cause the pistons and/or cylinders to wear and/or the engine to seize; a determination with certainty of the cause of the engine problem is nearly impossible in a worn or seized engine.

Thus, there exists a need in the art for a system and method for assembling an internal combustion engine wherein the actual measurements of the pistons and cylinders are used to select a particular piston for each cylinder, and wherein the resulting piston clearance is within a predetermined piston clearance tolerance. Moreover, there exists a need in the art for a system and method for correlating engine information with the host vehicle so as to permit retrieval of such engine information should an engine-related problem be reported.

SUMMARY OF THE INVENTION

The present invention is directed toward a system and method for assembling an internal combustion engine wherein the actual measurements of the pistons and cylinders are used to select a particular piston for each cylinder, and wherein the resulting piston clearance is within a predetermined piston clearance tolerance. The present invention is further directed toward a system and method for correlating engine information with the vehicle identification number so as to permit retrieval of such information should an engine-related complaint be received.

In accordance with a method of the invention, an engine block having a plurality of cylinders formed therein is provided. Each of cylinders in the engine block has a specific inner diameter that is within a predetermined cylinder inner diameter tolerance. The specific inner diameter of each cylinder formed in the engine block is recorded as cylinder information. A plurality of pistons, each having a specific outer diameter that is within a predetermined piston outer diameter tolerance, are provided. The specific outer piston diameter of each piston is recorded as piston information. A piston is selected for each cylinder using the recorded cylinder information and the recorded piston information so as to match pistons and cylinders and thereby provide a piston clearance for each cylinder that is within a predetermined piston clearance tolerance.

The present invention also provides a method for correlating piston information and cylinder information for an engine installed in a vehicle with a unique vehicle identification number assigned to the vehicle. The method includes providing an engine block having a plurality of cylinders formed therein; measuring the specific inner diameter of each cylinder; recording the specific inner diameter of each cylinder formed in the engine block as cylinder information; providing a piston for each cylinder formed in the engine block; measuring the specific outer diameter of each piston; recording the specific outer diameter of each piston as piston information; matching pistons with cylinders based upon the recorded piston and cylinder information so as to provide a predetermined piston clearance; recording engine information, which includes the piston and cylinder information, and correlating the engine information with a vehicle identification number of the host vehicle. The present invention permits retrieval of piston information and cylinder information for the particular engine/vehicle when, for example, an engine-related complaint is reported.

BRIEF DESCRIPTION OF THE DRAWINGS

These and further features of the invention will be apparent with reference to the following description and drawings, wherein.

DETAILED DESCRIPTION OF PREFERRED EMBODIMENTS

Figure 1:
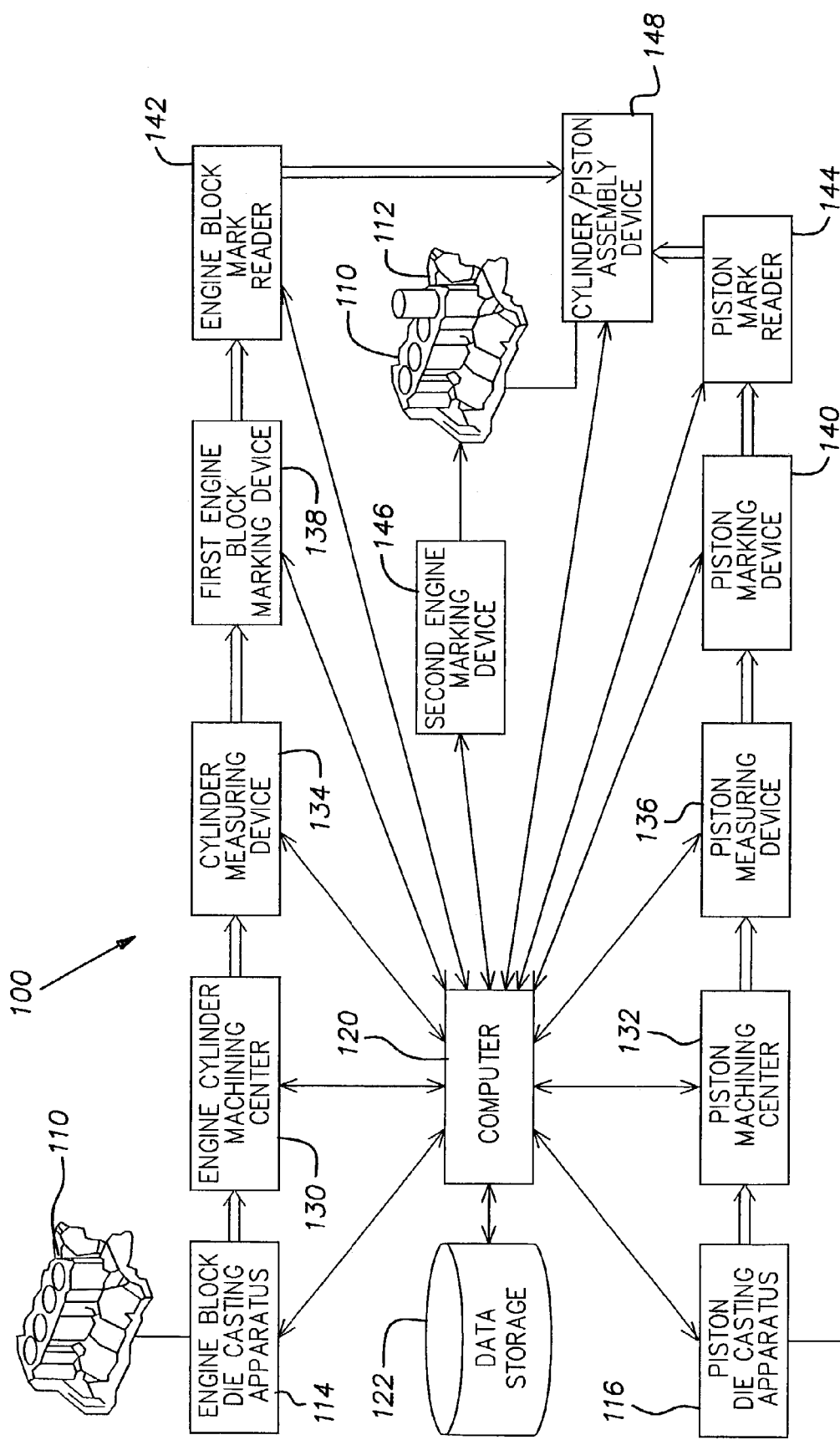
FIG. 1 is a schematic diagram of a system in accordance with the present invention.
Figure 2:
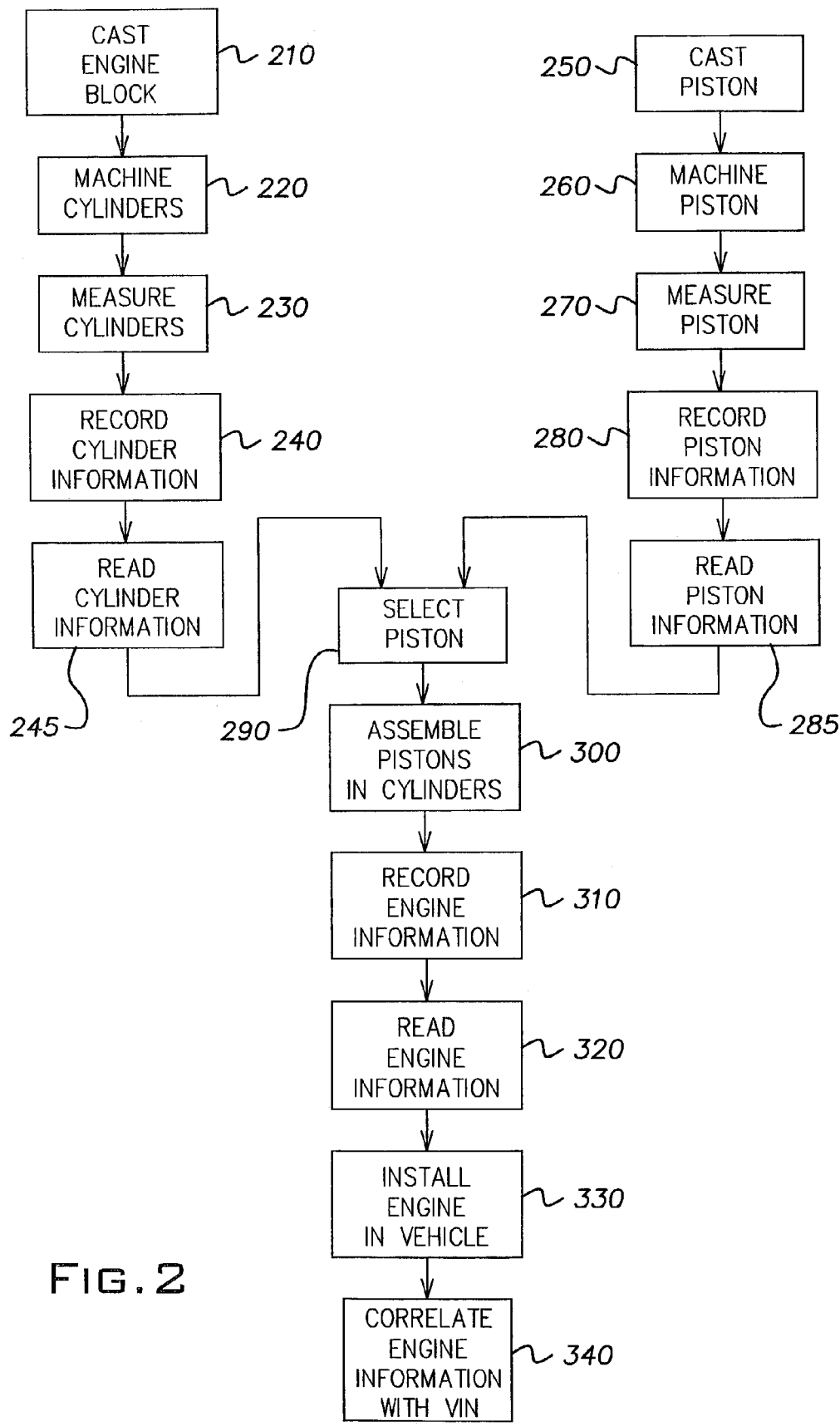
FIG. 2 is a block diagram of a method in accordance with the present invention.

A schematic diagram of a system 100 in accordance with the present invention is shown in FIG. 1, and a block diagram of a method of implementing the system 100 is shown in FIG. 2. The system 100 includes the devices for implementing a method for assembling an internal combustion engine that ensures that a piston clearance for each piston inserted into each cylinder formed in an engine block is within a predetermined piston clearance tolerance. The system 100 further includes devices that permit subsequent correlation of engine information, including cylinder/piston information, with a vehicle identification number, as will be apparent from the following discussion.

With specific reference to FIG. 1, the system 100 includes a computer 120, which has a data storage device 122, and communicates with an engine block die casting apparatus 114, a piston casting apparatus 116, an engine block machining center 130, a piston machining center 132, a cylinder measuring device 134, a piston measuring device 136, a first engine block marking device 138, a piston marking device 140, an engine block mark reader 142, a piston mark reader 144, a second engine block marking device 146, and a cylinder/piston assembly device 148.

The engine block 110 is formed in the die casting apparatus 114 (step 210), and engine block casting information is transmitted to the computer 120 and stored in the data storage device 122. Such engine block casting information may include the shot number, casting machine number, date, time, shift, etc. The engine block casting information may also be marked on or stamped into the engine block 110. The cast engine block 110 is then transferred to the engine block machining center 130 wherein the engine block cylinders are machined (step 220), as conventional. Engine block machining information is transmitted to the computer 100, and stored in the data storage device 122. The engine block machining information may include the machining center number, date, time, etc.

Thereafter, the actual inner diameters of the engine block cylinders are measured by the cylinder measuring device 134 (step 230). In order to be passed for further assembly, each of the cylinders formed in the engine block 110 must have a specific inner diameter that is within a predetermined cylinder inner diameter tolerance, which is defined as being the desired or intended inner diameter of the cylinder plus or minus an acceptable deviation or size variation. The "specific inner diameter" of a cylinder as used herein is the actual measured inner diameter of the cylinder. Assuming that the specific inner diameter of each of the cylinders is within a predetermined cylinder inner diameter tolerance, the engine block 110 is marked by the first engine block marking device 138 (step 240), as discussed hereinafter, with cylinder information including the actual measurements or specific inner diameter of each of the individual cylinders. The cylinder measurement information is also transmitted to the computer and stored in the data storage device 122.

Accordingly, the cylinder information is preferably recorded both physically on the engine block 110 by the first engine block marking device 138 and in the data storage device 122. Marking of the engine block 110 is preferably accomplished using a two-dimensional bar code marking device. The two-dimensional bar code, for example the DATACODE and PHILLIPS DOT CODE type of bar code, is able to store kilobytes worth of information in a single symbol. Accordingly, cylinder information marked on the engine block may include, in addition to specific inner diameter information, further information such as manufacturing data, lot numbers, and the like, may be recorded in the two-dimensional bar code. SYMBOL TECHNOLOGIES (Holtsville, N.Y.) supplies a suitable two-dimensional bar code marking device, as well as the software and hardware necessary to use the bar code symbol and system.

The piston 112 is formed in the piston die casting apparatus 116 (step 250), and piston casting information is transmitted to the computer 120 and stored in the data storage device 122. Such piston casting information may include the shot number, casting machine number, date, time, shift, etc. The piston casting information may also be marked on or stamped into the piston 112. The cast piston is then transferred to the piston machining center 132 wherein the pistons are machined (step 260), as conventional. Piston machining information is transmitted to the computer 120, and stored in the data storage device 122. The piston machining information may include the machining center number, date, time, etc.

Thereafter, the actual outer diameter of the machined piston 112 is measured by the piston measuring device 136 (step 270). The "specific outer diameter" of the piston 112 is the actual measured outer diameter of the piston 112. In order to be passed for further assembly, the piston 112 must have a specific outer diameter that is within a predetermined piston outer diameter tolerance, which is the desired or intended outer diameter of the piston 112 plus or minus an acceptable deviation or size variation. Assuming that the piston measurement or specific outer diameter is within the predetermined piston outer diameter tolerance, the piston is marked by the piston marking device 140 (step 280) with piston information including the actual measurement of the piston. The piston measurement information is also transmitted to the computer 120 and stored in the data storage device 122.

Accordingly, the piston information is preferably recorded both physically on the piston 112 by the piston marking device 140 and in the data storage device 122. The piston marking device 140 is preferably a two-dimensional bar code marking device, as discussed hereinbefore.

The system or device used to measure the specific inner diameter of the cylinders is not critical to the invention, and a wide variety of highly accurate measurement systems or devices, both direct or touch sensors or indirect or non-touch sensors, are known in the art and may be used interchangeably. Cylinder inner diameter tolerance limits are typically in the range of the desired cylinder inner diameter ± about 10 to about 15 μm. Naturally, the desired inner diameter of each cylinder will vary based upon the engine being manufactured.

Similarly, the particular system or device used to measure the specific outer diameter of the piston 112 is not critical to the invention, and any of the highly accurate measurement devices known in the art may be used interchangeably. Piston outer diameter tolerance limits are typically in the range of the desired piston outer diameter ± about 10 to about 15 μm. Naturally, the desired piston outer diameter will depend upon the engine in which the piston will be used.

As noted hereinbefore, the specific inner diameter of each cylinder is recorded as cylinder information (step 240) and the specific outer diameter of the piston 112 is recorded as piston information (step 250). Further, the cylinder and piston information is recorded in the computer data storage device 122 and recorded on the engine block 110 and piston 112, respectively. Most preferably, the piston information and cylinder information is marked on the piston and engine block, respectively, as a two dimensional bar code.

When a marked piston 112 reaches an appropriate stage in the manufacturing process, a piston mark reader 144 reads the previously recorded piston information off the piston (step 285). In the preferred embodiment, the piston mark reader 144 is a two-dimensional bar code reader that is operable to read the two dimensional bar code previously marked or recorded on the piston 112. The piston mark reader communicates the read piston information to the computer. Naturally, the read pistons are stored in a manner that permits each piston to be individually located and accessed. Preferably, the specific location of each piston is also transmitted to the computer and is used by the computer to subsequently identify the location of the desired piston (i.e., a piston with a desired specific outer diameter) or a piston from desired subset of pistons, as will be described more fully hereinafter.

Similarly, when an engine block 110, which has been previously marked with cylinder information, reaches a point in the assembly process wherein pistons 112 are to be inserted therein, the engine block mark reader 142 reads the cylinder information off of the engine block 110 (step 245). In the preferred embodiment, the engine block mark reader 142 is a two-dimensional bar code reader that is operable to read the cylinder information, which is in the form of a two dimensional bar code, and to communicate the read cylinder information to the computer 120.

The computer 120 uses the cylinder information provided from the engine block mark reader 142 and stored information previously provided from the piston mark reader 144 to identify or select a desired piston for each of the engine block's cylinders (step 290). The selected piston will be matched to the cylinder's inside diameter so as to provide a piston clearance that is within a predetermined piston clearance tolerance. The "predetermined piston clearance tolerance" is the desired piston clearance plus or minus a predetermined amount and may be determined by the following equations:

$$PC = C_{ID} - P_{OD} \text{ and,}$$

$$PCT = PC \pm X.$$

wherein PC is piston clearance, $C_{ID}$ is the specific cylinder inner diameter, $P_{OD}$ is specific piston outer diameter, PCT is piston clearance tolerance, and X is the acceptable deviation. Since the piston clearance and acceptable deviation are known, and because actual measurements of the cylinders and pistons are known, the computer may select an optimum piston for each cylinder. Therefore, the present invention allows for a substantially lower acceptable deviation or size variation from the desired piston clearance than is achievable using conventional engine assembly methods. Moreover, with the present invention, a substantially uniform piston clearance may be achieved.

For example, if the read cylinder information indicates that the specific inner diameter of a first cylinder formed in the engine block 110 is about 15 μm larger than the intended inner diameter of the cylinder, the computer will select a read piston having a specific outer diameter that is about 15 μm larger than the intended outer diameter of the piston for insertion into the first cylinder. Thus, a slightly oversized piston will be inserted into a slightly oversized cylinder, which achieves the intended piston clearance in the first cylinder.

The computer 120 compares the cylinder information and the piston information and then provides a set of instructions to the cylinder/piston assembly device 148 that includes the location and/or identity of the particular piston selected for insertion into each cylinder formed in the engine block. Since the computer 120 has access to the data storage device 122, which contains piston information and piston location information, the pistons need not be physically arranged or sorted in any particular manner, because the computer will issue instructions to the cylinder/piston assembly device 148 including the location and/or identity of each read piston.

More specifically, the cylinder/piston assembly device 148 receives instructions from the computer 120 regarding the location of the selected piston and the particular cylinder into which the selected piston is to be installed, and responds to these instructions by accessing, moving, and inserting the selected piston 112 into the particular cylinder (step 300). This identification, selection, and installation process is repeated to complete installation of the pistons in the available cylinders.

Thereafter, engine information is recorded (step 310). Preferably, the engine information is recorded both in computer memory (data storage device 122) and physically on the engine block 110 via the second engine block marking device 146. The second engine block marking device 146 is preferably a two dimensional bar code marking device, as discussed hereinbefore. The recorded engine information may include the piston information, the cylinder information, the piston clearance information for each cylinder, date, shift, cylinder/piston assembly device information, as well as any further information that may be desired. Thereafter, the preliminarily assembled engine is passed to further assembly.

Subsequently, when the engine is to be installed in a vehicle, which may be at a geographically remote location, the engine information is read off of the engine block (step 320) by a two dimensional bar code reader and stored in computer memory, and the engine is installed in the vehicle (step 330). The computer is adapted to correlate or associate engine information with the vehicle identification number (VIN) in a one-to-one manner, and the association or correlation of the vehicle identification number with the engine information is stored in computer memory (step 340), preferably in a database or lookup table. Accordingly, the engine information may be conveniently accessed, via the VIN, should engine related complaints be received by the manufacturer.

Such streamlined access to engine information allows the manufacturer to readily determine whether piston clearance related problems are attributable to environmental conditions (e.g., predominantly hot or cold weather or high altitudes). Moreover, providing the engine data permits the manufacturer to recreate or re-manufacture an engine having identical engine parameters (i.e., piston clearance) and to test the so-recreated engine at various operational or environmental conditions. Such testing permits the manufacturer to determine the affect of environmental conditions on engine performance, and to subsequently allow regionally-tuned or environmentally-tuned manufacture of engines having piston clearances adapted to their particular environments.

Figure 3:
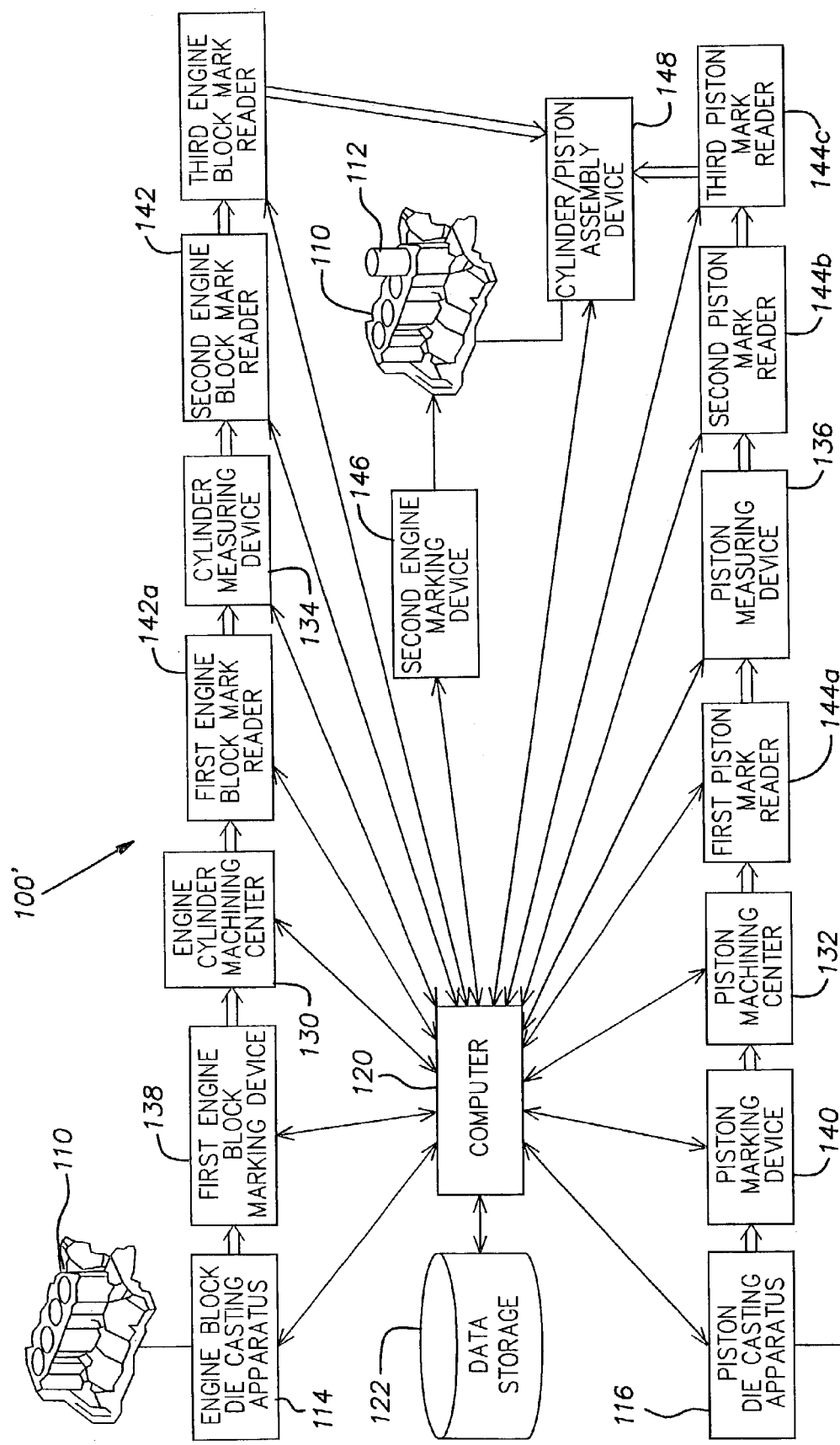
FIG. 3 is a schematic diagram of a system in accordance with a second embodiment of the present invention.
Figure 4:
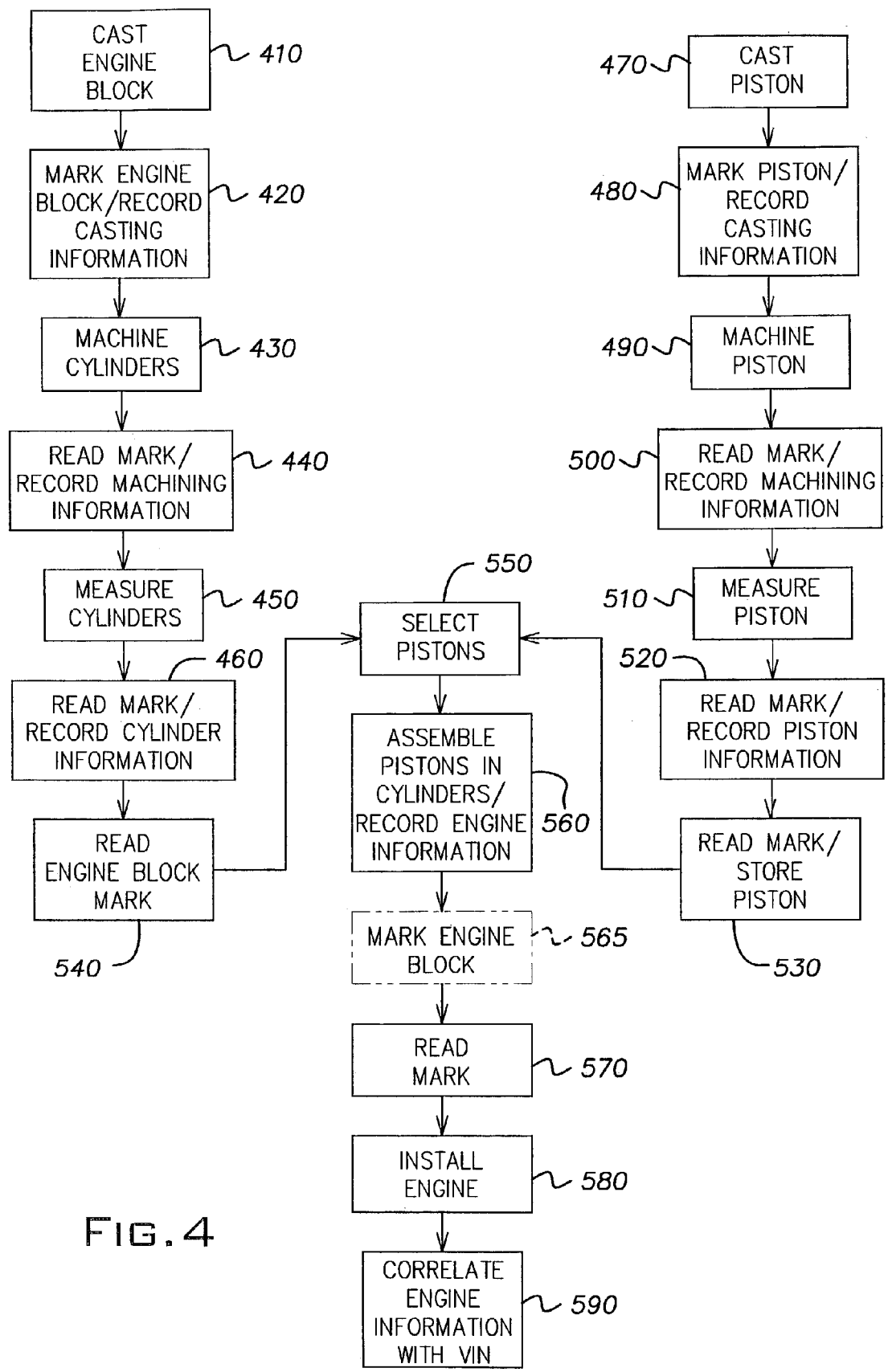
FIG. 4 is a block diagram of a method in accordance with the second embodiment of the present invention.

With reference to FIGS. 3 and 4, a second embodiment of the system and method according to the present invention is illustrated. It is noted that the second embodiment contains many of the same components as discussed previously with regard to the first embodiment, and these particular components carry the same reference numbers as used hereinbefore in FIGS. 1 and 2.

With specific reference to FIG. 3, the system according to the second embodiment includes a computer 120, a data storage device 122, an engine block die casting apparatus 114, a piston casting apparatus 116, an engine block machining center 130, a piston machining center 132, a cylinder measuring device 134, a piston measuring device 136, a first engine block marking device 138, a piston marking device 140, a plurality of engine block mark readers 142*a*, 142*b*, 142*c*, a plurality of piston mark readers 144*a*, 144*b*, 144*c*, a second engine block marking device 146, and a cylinder/piston assembly device 148.

The engine block 110 is formed in the die casting apparatus 114 (step 410). The first engine block marking device 138 marks the engine block with engine block identifying information (step 420). Such identifying information will be specific to the engine block, such as a serial number or, alternatively, the engine block casting information, or other information that may be used to identify the particular engine block. The marking device 138 communicates the identifying information to the computer 120, as well as casting information, and the computer stores the identifying information in the data storage device 122, which is preferably organized as a database. The engine block casting information may include the shot number, casting machine number, date, time, shift, etc.

The cast engine block 110 is then transferred to the engine block machining center 130 wherein the engine block cylinders are machined (step 430), as conventional. Before or after the machining operation, the first engine block mark reader 142*a* reads the engine block identifying mark off the engine block 110 (step 440), and thereafter transmits the engine block identifying information as well as the engine block machining information to the computer 120. The computer 120 associates the engine block machining information with the previously stored engine casting information for that particular engine block. The engine block machining information may include the machining center number, date, time, etc.

Thereafter, the actual inner diameters of the engine block cylinders are measured by the cylinder measuring device 134 (step 450). In order to be passed for further assembly, each of the cylinders formed in the engine block 110 must have a specific inner diameter that is within a predetermined cylinder inner diameter tolerance, which is defined as being the desired or intended inner diameter of the cylinder plus or minus an acceptable deviation or size variation. The "specific inner diameter" of a cylinder as used herein is the actual measured inner diameter of the cylinder. Before or after the measuring step, the second engine block reading device 142*b* reads the engine block mark and, assuming that the specific inner diameter of each of the cylinders is within a predetermined cylinder inner diameter tolerance, thereafter transmits the engine block identifying information and the cylinder information, which includes the actual measurements or specific inner diameter of each of the individual cylinders, to the computer 120 (step 460). The computer 120 uses the engine block identifying information to associate or correlate the cylinder information with the casting and machining information for that particular engine block 110.

Accordingly, in the second embodiment, the engine block identifying mark is used to identify each particular engine block 110 throughout the manufacturing process, and to permit engine block-specific information that is collected at various points in the manufacturing process to be stored in the data storage device 122 in a one-to-one relationship with the engine block 110. Accordingly, all of the engine block manufacturing information may be retained in the computer memory for subsequent use, as will be apparent from the following discussion.

As in the first embodiment, marking of the engine block 110 is preferably accomplished using a two-dimensional bar code marking device, and reading of the engine block identifying mark is preferably accomplished using a two-dimensional bar code reader 142*a*, 142*b*, 142*c*.

Similarly, the piston 112 is formed in the piston die casting apparatus 116 (step 420), and the piston is marked with piston identifying information by the piston marking device 140 (step 480). Such identifying information will be specific to each piston 112, and may be a serial number or may be the piston casting information. In any event, the piston identifying information and the piston casting information is transmitted to the computer 120 and stored in the data storage device 122. The piston casting information may include the shot number, casting machine number, date, time, shift, etc.

The cast piston 112 is then transferred to the piston machining center 132 wherein the pistons are machined (step 490), as conventional. The first piston mark reader 144*a* reads the piston identifying mark off the piston 112, and transmits the piston identifying information as well as the piston machining information to the computer 120 (step 500). The computer uses the piston identifying information to associate the piston machining information with the previously stored piston casting information for that particular piston 112. The piston machining information may include the machining center number, date, time, etc.

Thereafter, the actual outer diameter of the machined piston 112 is measured by the piston measuring device 136 (step 510). The "specific outer diameter" of the piston 112 is the actual measured outer diameter of the piston 112. In order to be passed for further assembly, the piston 112 must have a specific outer diameter that is within a predetermined piston outer diameter tolerance, which is the desired or intended outer diameter of the piston 112 plus or minus an acceptable deviation or size variation. Assuming that the piston measurement or specific outer diameter is within the predetermined piston outer diameter tolerance, the piston identifying mark is read by the second piston mark reader 144*b*, and transmits the piston identifying information and the piston information, which includes the actual measurements or specific outer diameter of the piston, to the computer 120 (step 520). The computer 120 uses the piston identifying information to associate or correlate the piston information with the casting information and machining information for that particular piston 112.

Accordingly, in the second embodiment, the piston identifying mark is used to identify the particular piston 112 throughout the manufacturing process, and to permit piston-specific information that is collected at various points in the manufacturing process to be stored in the data storage device 122 in a one-to-one relationship with the piston 112. Accordingly, all of the manufacturing information for each individual piston may be retained in the computer memory for subsequent use, as will be apparent from the following discussion.

When a piston 112 reaches an appropriate stage in the manufacturing process, a third piston mark reader 144*c* reads the piston identifying mark off the piston (step 285) and the piston is stored in a piston storage rack. A storage location of the piston within the piston storage rack, together with the piston identifying information, is communicated to the computer 120 (step 530). The computer uses the piston identifying information to associate the piston storage location with the piston information, casting information, and machining information for that particular piston. Accordingly, information for the plurality of stored pistons is provided in a database that permits convenient searching of piston information to match pistons with cylinders, as will be described hereinafter.

Similarly, when an engine block 110 reaches a point in the assembly process wherein pistons 112 are to be inserted therein, the third engine block mark reader 142*c* reads the engine block identifying mark off of the engine block 110 (step 540) and communicates the engine block identifying information to the computer. The computer uses the engine block identifying information to access the previously stored cylinder information for that particular engine block, and uses the cylinder information to determine an optimum piston outer diameter for each cylinder.

Accordingly, the computer 120 searches through the database of piston information to identify the piston 112 having the most desirable specific outer diameter for each cylinder (step 550). The storage location for a selected desired piston, as well as the information regarding the cylinder into which the selected desired piston is to be installed, is communicated from the computer to the cylinder/piston assembly device 148, and the cylinder/piston assembly device 148 responds to these instructions by accessing, moving, and inserting the selected desired piston 112 into the particular cylinder (step 560). This identification, selection, and installation process is repeated to complete installation of the pistons in the available cylinders.

The computer 120 associates the selected piston 112 with the engine block 110, including the particular cylinder into which each selected piston has been inserted. The computer also preferably compiles engine information, which preferably includes all of the previously recorded manufacturing information for each selected piston and the engine block, including identification of the particular cylinders into which each individual selected piston has been inserted, and associates or correlates the engine information with the engine block identifying mark/information. Accordingly, the engine block identifying information can be used to obtain all of the manufacturing information collected for the pistons 112 and engine block 110.

The engine information, in the form of a two dimensional bar code, may subsequently be marked on the engine block by use of the second engine block marking device 146 (step 565). However, as will be appreciated by those skilled in the art from the following discussion, marking of the engine information on the engine block may be omitted in some circumstances, and can be considered to be optional.

Assuming that the engine information is marked on the engine block 110, when the engine is to be installed in a vehicle, which may be at a geographically remote location, the engine information is read off of the engine block (step 570) by a two dimensional bar code reader and stored in computer memory, and the engine is installed in the vehicle (step 580). The computer correlates or associates engine information with a vehicle identification number (VIN) of the vehicle in a one-to-one manner, and the association or correlation of the vehicle identification number with the engine information is stored in computer memory (step 590), preferably in a database or lookup table. Accordingly, the engine information may be conveniently accessed, via the VIN, should engine related complaints be received by the manufacturer.

Alternatively, if the engine information is not marked on the engine block, when the engine is to be installed in a vehicle, the engine block identifying mark is read off of the engine block (step 570) by a two dimensional bar code reader. The engine block identifying mark is communicated to the computer, and used by the computer to obtain the engine information for the particular engine being installed in the vehicle (step 580). The computer correlates or associates the engine information with a vehicle identification number (VIN) of the vehicle in a one-to-one manner, and the association or correlation of the vehicle identification number with the engine information is stored in computer memory (step 590), preferably in a database or lookup table. Accordingly, the engine information may be conveniently accessed, via the VIN, should engine related complaints be received by the manufacturer.

The second embodiment of the present invention therefore associates the engine information with the VIN in a primarily software-based system wherein marking of the pistons and engine block is reduced or minimized. In this regard it is noted that the engine block/piston identifying information could be marked on a carrier or holder for each engine block/piston, or on a tag or label affixed to the engine block/piston. With the carrier-born or tag-born mark identifying the engine block/piston, the engine block/piston information that is stored in computer memory and associated with the carrier-born mark, would only have to marked once at the end with engine information and the pistons would not have to be marked at all. Accordingly, modifications to the measuring, data recording, and marking process to reduce costs or to increase speed of assembly of the engine are contemplated.

Although in the most preferred embodiments of the present invention two dimensional bar code marking devices are employed, in accordance with the present invention and assuming that sufficient data may be stored thereby, the first and second engine block marking devices 138, 142 and the piston marking device 140 may alternatively be, for example, high-speed ink jet printers, laser markers, and etching and/or stamping devices. Suitable two-dimensional bar code marking systems are commercially available under the tradenames DATAMAX from DATAMAX BAR CODE PRODUCTS, INC. (Orlando, Fla.) and HHP IMAGETEAM from WELCH ALLYN DATA COLLECTION, INC (Skaneateles, N.Y.).

It will be appreciated that the principles of the present invention can be utilized with other components of internal combustion engines such as valves, lifters, camshafts, connecting rods, etc. In any situation where two or more engine parts are fitted together, the principles of the present invention can be applied to insure that the clearances or tolerances between the two parts are maintained within predetermined limits. Moreover, recordation of data associated with other engine components can permit more detailed remote and non-invasive recreation of engines for testing and post-manufacture quality control purposes. Further, the present invention can be used with other components of the vehicle that are not part of the engine assembly. For example, components of the drive train or suspension system can be measured, sorted, marked and selected for use based on the individual component measurements. The measurements can include tolerance data relating to physical size characteristics, but can also include measurements of hardness, ductility, wear resistance, chemical composition, and other measurable parameters attributable to vehicle parts that can affect the interaction of one part with another part on the vehicle. Accordingly, the present invention can be readily scaled or modified by one skilled in the art to include different or additional manufacturing information that may be of interest.

In addition, the database can be maintained indefinitely so that during subsequent maintenance or repair of the vehicle, the VIN is used to access the recorded engine information that may be used to identify dimensions for replacement parts and thereby permit replacement part selection that is optimized for the particular vehicle being repaired or maintained.

The present invention may also be modified or implemented in different manners. For example, with regard to sorting and identification of pistons in the first embodiment, the piston information can be used to presort each piston into one of a plurality groups, wherein each group of pistons includes only pistons having a specific outer piston diameter that is within a fractional range of the predetermined piston outer diameter tolerance. Such sorting may be thought of as employing what is known as fuzzy logic. In such a circumstance, the computer need not know the precise location and/or identity of each individual piston, but merely must issue a set of instructions, based upon the cylinder's specific inner diameter derived from the cylinder information that identifies the particular group from which a piston should be selected for insertion into each cylinder formed in the engine block so as to provide a desired piston clearance.

The greater the number of groups the pistons are presorted into, the lower the predetermined piston clearance tolerance achievable. Preferably, the pistons are presorted into at least 2 groups. More preferably, the pistons are presorted into one of n groups of pistons, where n is greater than or equal to 2 and less than or equal to 10, and each group of pistons includes only pistons having a specific outer piston diameter that is within about a 1/n fraction of the range of acceptable piston outer diameters within predetermined piston outer diameter tolerance. When n is about 10, the method of the present invention reduces the predetermined piston clearance tolerance to the desired piston clearance ± about 3 micrometers ($\mu$m). This is a 90% improvement over the conventional piston clearance tolerance values attainable using conventional methods.

Additionally, use of the present invention makes it possible to create an engine whose tolerances are specially adapted or selected for use in a particular environment (hot/cold) or region. For example, an engine with particularly close tolerances may be more suitable for a normally cold climate environment whereas an engine with greater tolerances may be more suitable for a normally hot climate. Moreover, by using feedback generated from post-sale engine-related problems, the selection or matching or pistons-cylinders can be optimized.

Although the invention has been described herein as it relates to engines and pistons that are manufactured at the same facility, it is considered apparent that the engines and pistons could be manufactured, machined, measured, and marked with engine/piston information at separate locations, and then transported to an assembly location for reading of the engine block/piston information and further assembly. It is further considered apparent that the manufacturing process may be segmented in a different manner. For example, the pistons and engine blocks may be cast and machined at one or more facilities, and then transported to the assembly facility, at which point the engine blocks and pistons will be measured and marked prior to assembly. Accordingly, the present invention is not to be limited to an integrated manufacturing environment.

Additional advantages and modifications will readily occur to those skilled in the art. Therefore, the invention in its broader aspects is not limited to the specific details and illustrative examples shown and described herein. Accordingly, various modifications may be made without departing from the scope of the present invention as defined by the appended claims and their equivalents.

What is claimed is:

1. A method for assembling an internal combustion engine, comprising the steps of:
   providing an engine block having a plurality of cylinders formed therein, each of the cylinders having a specific inner diameter that is within a predetermined cylinder inner diameter tolerance;
   recording the specific inner diameter of each cylinder formed in the engine block as cylinder information;
   providing a plurality of pistons each having a specific outer diameter that is within a predetermined piston outer diameter tolerance;
   recording the specific outer diameter of each piston as piston information;
   selecting one of the plurality of pistons for each cylinder based upon the recorded cylinder information, the recorded piston information, and a desired piston clearance; and,
   installing the selected pistons into the cylinders.

2. The method for assembling an internal combustion engine according to claim 1, wherein the cylinder information is recorded by marking same on the engine block.

3. The method for assembling an internal combustion engine according to claim 2, wherein the cylinder information is marked on the engine block in the form of a two-dimensional bar code.

4. The method for assembling an internal combustion engine according to claim 1, wherein the piston information is recorded by marking same on the piston.

5. The method for assembling an internal combustion engine according to claim 4, wherein the piston information is marked on the piston in the form of a two-dimensional bar code.

6. The method for assembling an internal combustion engine according to claim 3, wherein the piston information is recorded by marking same on the piston.

7. The method for assembling an internal combustion engine according to claim 6, wherein the piston information is marked on the piston in the form of a two-dimensional bar code.

8. The method for assembling an internal combustion engine according to claim 1, wherein cylinder information is recorded by storing same in computer memory.

9. The method for assembling an internal combustion engine according to claim 1, wherein piston information is recorded by storing same in computer memory.

10. The method for assembling an internal combustion engine according to claim 8, wherein piston information is recorded by storing same in computer memory.

11. The method for assembling an internal combustion engine according to claim 1, further comprising the step of using the recorded piston information to sort the plurality of pistons into a plurality of groups, wherein each group of pistons consists of pistons having a specific outer diameter that is within a fractional range of the predetermined piston outer diameter tolerance.

12. The method for assembling an internal combustion engine according to claim 11, wherein the recorded cylinder information is used to select one piston from said plurality of groups of pistons for each cylinder.

13. The method for assembling an internal combustion engine according to claim 2, further comprising the step of using the recorded piston information to sort the plurality of pistons into a plurality of groups, wherein each group of pistons includes only pistons having a specific outer piston diameter that is within a fractional range of the predetermined piston outer diameter tolerance.

14. The method for assembling an internal combustion engine according to claim 13, further comprising the step of reading the cylinder information marked on the engine block and selecting said one piston from one of the plurality of groups of pistons.

15. The method for assembling an internal combustion engine according to claim 1, wherein the predetermined piston clearance tolerance is a desired piston clearance ±3 $\mu$m.

16. The method for assembling an internal combustion engine according to claim 6, wherein each piston is sorted into one of n groups of pistons, and wherein each group of pistons consists of pistons having a specific outer diameter that is within about a 1/n fractional range of the predetermined piston outer diameter tolerance.

17. The method for assembling an internal combustion engine according to claim 16, wherein n is less than or equal to 10.

18. A method for assembling an internal combustion engine, comprising the steps of:
   providing a plurality of pistons each having a specific outer diameter that is within a predetermined piston outer diameter tolerance;
   marking each piston with piston information including the specific outer diameter of the piston;
   providing an engine block having a plurality of cylinders formed therein, each of the cylinders having a specific inner diameter that is within a predetermined cylinder inner diameter tolerance;
   marking the engine block with cylinder information including the specific inner diameter of each of the plurality of cylinders;
   reading the cylinder information and the piston information;
   selecting and installing one of said plurality of pistons for each cylinder based upon the read cylinder information and the read piston information so as to provide a piston clearance for each cylinder that is within a predetermined piston clearance tolerance.

19. The method for assembling an internal combustion engine according to claim 18, further comprising the step of using the piston information to sort the plurality of pistons into one of n groups of pistons, wherein:
   each group of pistons consists of pistons having a specific outer diameter that is within a 1/n fractional range of the predetermined piston outer diameter tolerance, wherein n is greater than or equal to 2; and
   after the cylinder information marked on the engine block is read, selecting one piston from the groups of pistons for each cylinder so as to provide a piston clearance for each cylinder that is within a predetermined piston clearance tolerance.

20. The method for assembling an internal combustion engine according to claim 19, wherein the cylinder information is marked on the engine block in the form of a two-dimensional bar code and the piston information is marked on the piston in the form of a two-dimensional bar code.

21. The method for assembling an internal combustion engine according to claim 18, comprising the further step of marking said engine block with engine information, said engine information including said cylinder information, piston information for each of the selected pistons, and an identification regarding the cylinders into which the selected pistons are installed.

22. The method for assembling an internal combustion engine according to claim 21, wherein said engine information is marked on the engine in the form of a two dimensional bar code.

23. A method for correlating piston information and cylinder information for an engine installed in a vehicle with a vehicle identification number assigned to the vehicle, comprising the steps of:
provide an engine block having a plurality of cylinders formed therein;
measuring a specific inner diameter of each cylinder formed in the engine block;
recording the specific inner diameter of each cylinder as cylinder information;
providing a plurality of pistons;
measuring a specific outer diameter of each piston;
recording the specific outer diameter of each piston as piston information;
selecting and installing one of the pistons into each of the cylinders based upon the cylinder information and piston information so as to provide a desired piston clearance for each cylinder/piston combination;
recording engine information, which includes said piston information and said cylinder information;
associating the engine information with the vehicle identification number so that engine information may be derived from the vehicle identification number.

24. The method according to claim 23, wherein at least some of the piston, cylinder, and engine information is recorded by marking same in the form of a two dimensional bar code on the piston or engine block, respectively.

25. The method according to claim 23, wherein at least some of the piston, cylinder, and engine information is recorded in computer memory.

26. A method for matching pistons with cylinders formed in an engine block during assembly of an internal combustion engine so as to provide a desired piston clearance, comprising the steps of:
providing piston information for each piston, said piston information including a specific outer diameter of said piston;
providing cylinder information for each cylinder formed in said engine block, said cylinder information including a specific inner diameter of said cylinder;
selecting one piston from said plurality of pistons for each cylinder based upon said piston information, said cylinder information, and said desired piston clearance.

27. The method according to claim 26, wherein said piston information is marked on said piston as a two dimensional bar code.

28. The method according to claim 26, wherein said cylinder information is marked on said piston as a two dimensional bar code.

29. The method according to claim 26, wherein said piston information is stored in computer memory.

30. The method according to claim 26, wherein said cylinder information is stored in computer memory.

* * * * *